Feb. 23, 1960  J. R. HAYES ET AL  2,925,998
TURBINE NOZZLES
Filed Dec. 22, 1952
2 Sheets-Sheet 1

Inventors
John R. Hayes &
Stephen C. Lampman
By Willits, Helwig & Bailles
Attorneys Feb. 23, 1960    J. R. HAYES ET AL    2,925,998
TURBINE NOZZLES
Filed Dec. 22, 1952    2 Sheets-Sheet 2

Inventors
John R. Hayes &
Stephen C. Lampman
By Willis, Helmig & Baillie
Attorneys

United States Patent Office 2,925,998
Patented Feb. 23, 1960

2,925,998
TURBINE NOZZLES

John R. Hayes and Stephen C. Lampman, Indianapolis, Ind., assignors to General Motors Corporation, Detroit, Mich., a corporation of Delaware Application December 22, 1952, Serial No. 327,378

14 Claims. (Cl. 253—78)

Our invention relates to turbine nozzles and especially to nozzle structures particularly suited for high temperature gas turbines. The nozzle structures according to the invention are particularly adapted to withstand the disturbing effects of high temperature and rapid temperature changes encountered in gas turbines, and most troublesome in turbines for aircraft propulsion. Because of the great temperature range involved and the rapid changes of temperature when an engine is put into or out of service, or when abnormal operating conditions such as flame-outs occur, it has been very difficult to provide nozzle structures which have been able to withstand the operating conditions in turbojet engines. As a result of the thermal stresses and operating loads on the nozzles, distortions and failures have occurred.

As a result of these failures, it has become common practice to make each turbine nozzle of a number of arcuate segments, each segment being a substantially independent structure. With such a construction, space can be left between the segments of the shroud rings so that they may expand circumferentially. Such a construction, of course, produces problems of sealing and involves an expensive and difficult structure to manufacture. In such nozzles, the nozzle vanes are ordinarily welded to both the inner and outer shroud segments.

Our invention is directed to the improvement of turbine nozzles and to the provision of a nozzle which is much easier to fabricate, assemble, and repair than those previously known, as well as more satisfactory in service. In general, in the nozzles according to our invention, the shroud rings are preferably continuous and the nozzle vanes are slidably mounted in both shroud rings. Simple means are provided to retain the shroud rings assembled and this means is such that a reasonable tolerance for relative expansion of the parts is provided and is also such that a defective vane may be easily removed and replaced.

The nature of the invention and the advantages thereof will be more fully apparent to those skilled in the art from the accompanying drawings and the succeeding description thereof.

Referring to the drawings.

The turbine nozzles illustrated herein embodying various forms of the invention are all illustrated in a form suitable for installation in an aircraft turbojet engine of known type. Because the engine is known generally and the nozzle structures according to the invention may be understood without reference to details of construction of the engine, we have illustrated the engine only fragmentarily, the illustration being sufficient to show the location and installation of the improved nozzles in a typical gas turbine engine.

Figure 1:
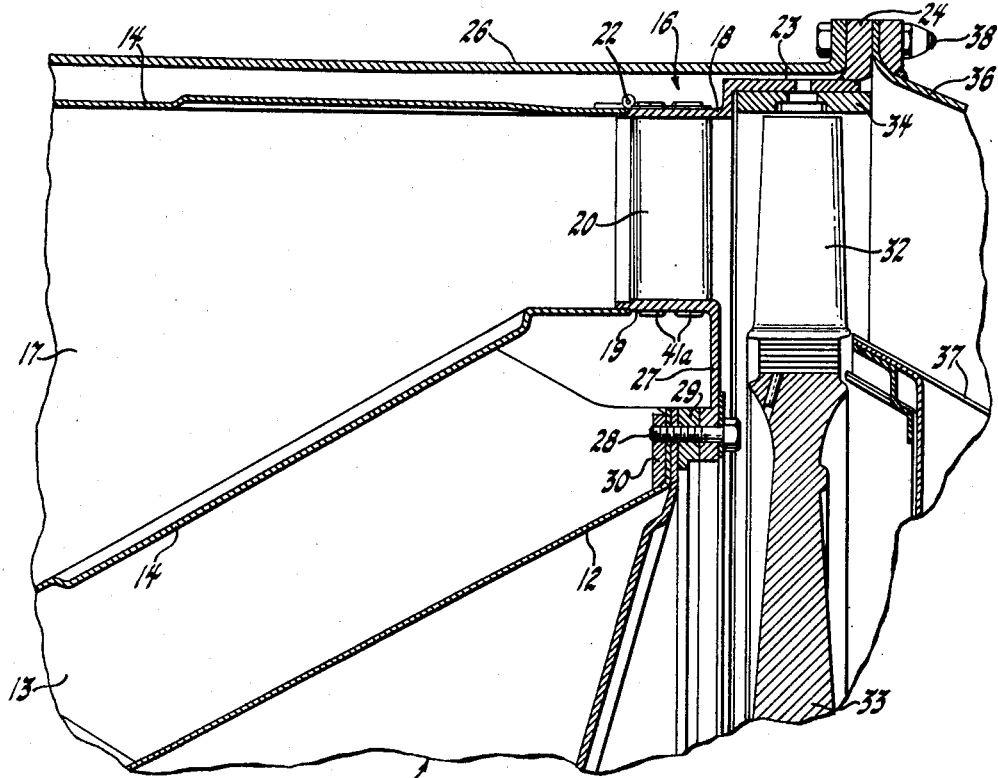
Fig. 1 is a partial sectional view of a gas turbine engine incorporating one embodiment of the invention, the section being taken on a plane containing the axis of the turbine.

Referring first to Fig. 1, the fixed framework of the engine which supports the compressor, combustion chambers, and turbine includes the aft frame 11 which includes a portion 12 which extends between the combustion chambers from the compressor to the turbine. Gusset plates or stiffeners 13 extend from the part 12 of the aft frame to a plate perpendicular to the axis of the engine (not shown) which supports the after ends of the combustion chambers (not shown) and the forward ends of transition tubes 14 which extend from the combustion chambers to the turbine nozzle 16, each transition liner defining a conduit 17 for the hot motive gases.

The turbine nozzle comprises an outer shroud ring 18, an inner shroud ring 19, and generally radial vanes 20. The discharge end of the transition tube 14 fits over the functionally outer surfaces of the nozzles so as to discharge the motive fluid into the nozzle. It will be understood that the discharge end of each transition tube is in the form of a sector of an annulus, the engine comprising a number of such tubes so as to discharge motive fluid to the entire annulus of the turbine nozzle. By the term "functionally outer surface" of a shroud ring is meant the radially outer surface of the outer shroud and the radially inner surface of the inner shroud, these being the outer surfaces of the shrouds with relation to the motive fluid path. The transition tubes 14 may be fixed to the outer shroud 18 by a wire 22 extending through bent over sheet metal tabs on the shroud and the outer surface of the transition tube, the arrangement being similar to a hinge joint. The outer shroud 18 is integral with a turbine case 23 on which is a bolting flange 24. The flange 24 is bolted to an aft frame case 26 which is a part of the frame of the engine when bolted in place and is supported rigidly with aft frame structure 12. The inner shroud 19 of the nozzle is integral with a radial flange 27. This flange is joined by a ring of cap screws 28, which extend through stiffening rings 29 and 30, to the outer edge of the aft frame portion 12. Thus, it will be seen that both the inner and outer shrouds are supported from the fixed engine structure.

The turbine nozzle 16 delivers the motive fluid to buckets 32 on the turbine wheel 33, the buckets rotating within a turbine case liner 34 mounted in the portion 23 of the turbine outer shroud. The motive fluid is discharged from the turbine through an annular duct defined by an outer wall 36 and an inner wall or cone 37, this structure being bolted to the flange 24 of the turbine case and to the outer casing 26 by bolts 38.

Figure 2:
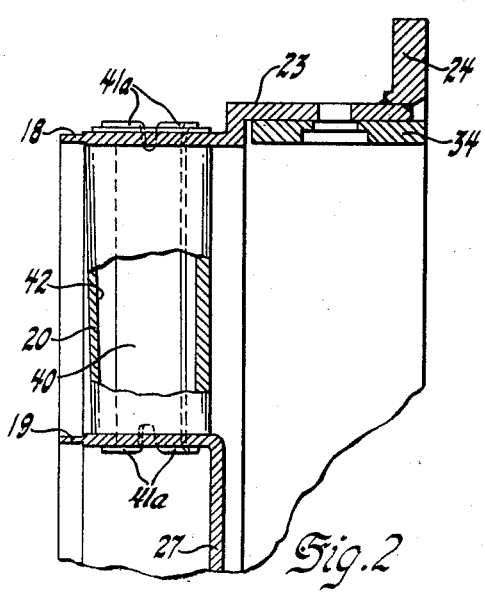
Fig. 2 is an enlarged view of a portion of Fig. 1 with parts broken away.
Figure 3:
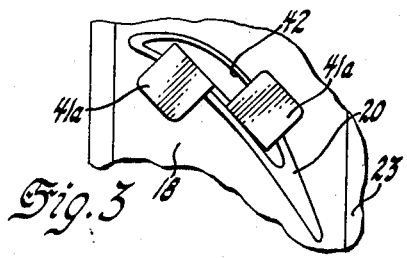
Fig. 3 is a fragmentary view of the outer surface of a shroud ring showing a vane in position.

The structure so far described is known. Our invention relates to the nozzle structure, the preferred form of which is shown more clearly in Figs. 2 to 4. In the form of the nozzle shown in these figures, as well as in the other embodiments of the invention, the inner and outer shroud rings are punched or otherwise formed with holes conforming to the cross sectional outline of the outer and inner ends of the nozzle vanes, so that the vanes may be slipped into position in these openings in the shrouds. The vanes 20 are hollow and, in general, may be cast, may be folded and welded sheet metal construction, or may be formed in other ways, if desired. The vanes are not welded or otherwise fixed to the shroud rings but are freely slidable therein for assembly and disassembly and to accommodate expansion and relieve stresses in service. The shrouds 18 and 19 are continuous and are not slotted or segmented, since variations in sizes of the parts are accommodated by sliding of the vanes in the shrouds. Preferably, each vane is slightly longer than the total distance between the functionally outer surfaces of the shrouds when the engine is cold.

Various means may be utilized to retain the vanes in the shrouds, the preferred means being that illustrated in Figs. 1 to 4. In this form of the invention, the retainer 40 is simply a strip or part of sheet metal notched at the ends to provide two tabs 41 at each end, the retainer or key being flat, as shown in the upper view of Fig. 4, before assembly so that it may be readily passed through the central opening 42 within the nozzle vane. When the retainer is in place, the tabs at each end are bent in opposite directions so that the bent tabs 41a provide a head on each end of the retainer. The retainer is thus locked onto the vane and provides an abutment on each end of the vane so that it is held from sliding out of either shroud. It will be noted that the abutments 41a define a space between them which is slightly greater than the external distance across the shroud rings, thus providing for some difference in expansion between the vanes and the shroud rings and their supports.

It will be understood, of course, that the retainer 40 as well as all other parts of the engine exposed to high temperatures are made of appropriate materials. It will also be apparent that if a vane should fail in service, it is very easy to cut off or straighten the retainer, knock the vane out, and substitute a new vane and a new retainer. The retainers serve to hold the nozzles in assembled relation before the shroud rings are bolted to the supporting structures in the engine.

Figure 4:
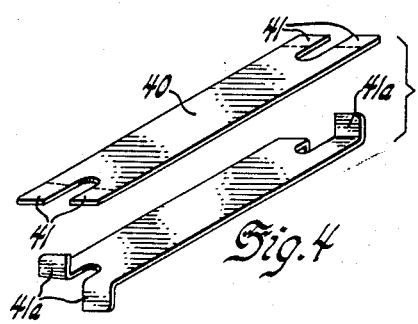
Fig. 4 is a composite figure containing axonometric views of a deformable vane retainer before and after deformation.
Figure 5:
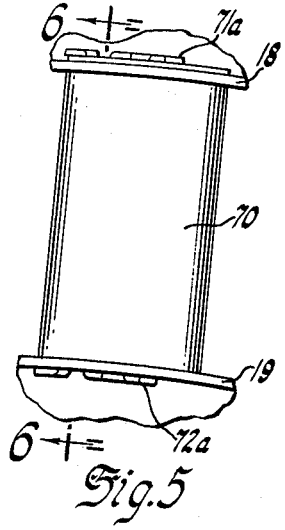
Fig. 5 is a fragmentary elevational view of a turbine nozzle according to a second embodiment of the invention.
Figure 6:
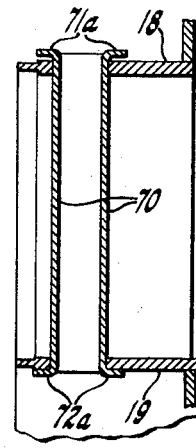
Fig. 6 is a sectional view of the same taken on a plane containing the axis of the nozzle as indicated in Fig. 5.
Figure 7:
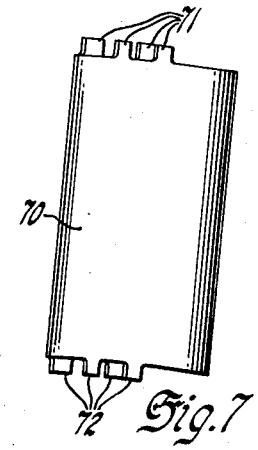
Fig. 7 is an elevational view of the vane of Fig. 5 before assembly with the shroud rings of the nozzle.

Referring now to Figs. 5 to 7, which illustrate a second embodiment of the invention, it will be understood that the general installation in this case is the same as that in Fig. 1 and, therefore, it is unnecessary to show the mounting of the nozzle in the engine. The nozzle of Fig. 5 comprises an outer shroud 18 an inner shroud 19, and a number of hollow vanes 70, only one of which is illustrated, extending between the outer and inner shrouds. The shrouds may be mounted in the engine, that is, connected to the fixed framework of the engine, in the same way as shrouds 18 and 19 of Fig. 1. The vane 70 is made of folded sheet metal or thin metal tubing formed to a suitable cross section which may be similar to that of the vane 20 of Figs. 1 and 3. In this embodiment of the invention, the vane is adapted for formation from sheet metal rather than casting because portions of the side walls of the vanes are extended to provide deformable parts or tabs 71 and 72 (Fig. 7). These tabs, as the blade is formed, are continuations of the lateral surfaces of the blade, but after the vane is inserted into position extending through the mating openings in the shroud rings 18 and 19, the tabs are bent outward as indicated at 71a and 72a to form heads or abutments to retain the vane in position. As will be apparent, the length of the vane is slightly greater than the distance across the nozzles so that a suitable clearance is provided between the tabs and the surface of one of the shrouds. As will be seen, the form of Figs. 5 to 7 is somewhat simpler structurally than that of Figs. 2 to 4 in that no separate retainers are required. On the other hand, it is not adapted for cast nozzle vanes and, if a nozzle vane is removed, it must be thrown away, whereas with the form of Figs. 2 to 4, a vane may be removed and replaced, a new retainer only being required.

Figure 8:
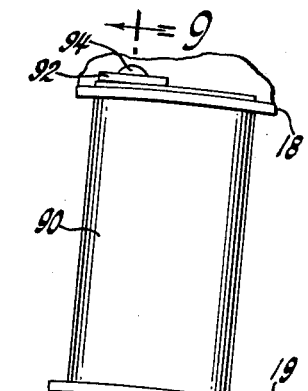
Fig. 8 is a fragmentary front elevational view of a turbine nozzle illustrating a third embodiment of the invention.
Figure 9:
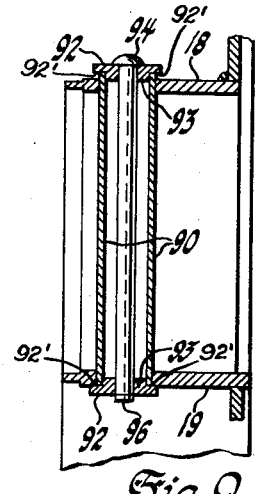
Fig. 9 is a sectional view of the same taken on a plane, indicated in Fig. 8, which contains the axis of the nozzle.

The remaining forms of the invention, shown in Figs. 8 to 11, may include nozzle shrouds and vanes of the same type and same form as those previously described in connection with Figs. 1 to 4. The difference lies in the form, nature, and manner of application of the retainer in Figs. 8 to 11. Hollow vanes 90 extend between the outer shroud 18 and the inner shroud 19, extending through mating openings in the shroud rings. In Fig. 8, a washer, cap, or plate 92 is mounted at each end of the vane, the washers including pilot portions 93 that extend slightly into the interior of the vane. The margins of the washers extend beyond the surface of the vane to provide heads or abutments 92' to retain the vane at each end against sliding out of the shroud. The plates 92 are held in place by a securing means such as a long pin or rivet 94 with a head at one end and split as indicated at 96 at the other end so that this end may be spread to hold the parts 92 in position.

Figure 10:
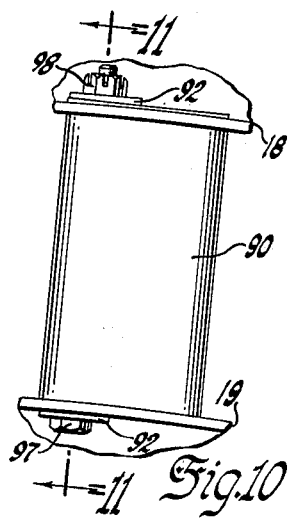
Fig. 10 is a fragmentary elevational view of a turbine nozzle illustrating a fourth embodiment of the invention.
Figure 11:
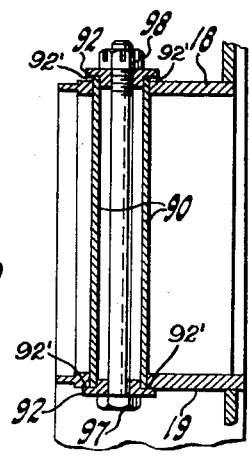
Fig. 11 is a sectional view of the same taken on a plane, indicated in Fig. 10, which contains the axis of the nozzle.

In Figs. 10 and 11, the heads or washers 92 are retained by a securing means comprising a bolt 97 extending the length of the vane and through the two washers and a nut 98 on the bolt. The vane retaining means of Figs. 8 to 11 perform the same function as that of Fig. 4, but the form of Fig. 4 is preferred for its simplicity and ease of application and removal.

It will be understood that the various retaining means do not carry any considerable load, since the gas forces on the vanes are substantially normal to the lengthwise direction of the vanes. In all the forms of the invention, these vanes are loosely enough fitted into the shrouds to slide in and out readily for assembly and to permit slipping of one part on another to compensate for expansion due to temperature changes. In all forms, the manufacture of the vanes and shrouds and the procedure in assembling them are relatively simple and readily accomplished. The invention makes it extremely simple to repair a damaged nozzle. The elimination of segmented shroud constructions also is beneficial in simplifying the engine construction.

The description herein of the preferred embodiment of the invention for the purpose of illustrating the principles thereof is not to be considered as limiting the invention, since many modifications of the invention within the scope thereof may be devised by the exercise of skill in the art.

We claim:

1. A turbine nozzle comprising, in combination, a first shroud, a second shroud, hollow vanes extending between the shrouds, the vanes extending slidably through each shroud, and a part extending through each vane and having heads on the ends of the part engaging the ends of the vane and overlying the functionally outer surfaces of the shrouds to retain the vane in the shrouds.

2. A turbine nozzle comprising, in combination, a first shroud, a second shroud, hollow vanes extending between the shrouds, the vanes extending slidably through each shroud, and a part extending through each vane and having portions at the ends thereof deformable to provide heads on the ends of the part engaging the ends of the vane and adapted to overlie the functionally outer surfaces of the shrouds to retain the vane in the shrouds.

3. A turbine nozzle comprising, in combination, a first shroud, a second shroud, hollow vanes extending from one shroud to the other, the shrouds having openings therethrough dimensioned to receive the vanes slidably, the vanes extending slidably through the openings and being slightly longer than the distance between the functionally outer surfaces of the shrouds, and means at each end of each vane connected to the vane and extending laterally from the vane so as to overlie the functionally outer surfaces of the shrouds, the distance between the said means being greater than the distance between the functionally outer surfaces of the shrouds to provide limited clearance between the said means and shrouds, the said means being unattached to the shrouds, one of said means being tab means bendable from a condition providing clearance for passage thereof through the openings in the shrouds to a position extending laterally from the vane so as to overlie one of the shrouds.

4. A turbine nozzle comprising, in combination, a first shroud, a second shroud, hollow vanes extending from one shroud to the other, the shrouds having openings therethrough dimensioned to receive the vanes slidably, the vanes extending slidably through the openings and being slightly longer than the distance between the functionally outer surfaces of the shrouds, and a bendable tab part at each end of each vane connected to the vane and extending laterally from the vane so as to overlie the functionally outer surfaces of the shrouds, the distance between the said parts being greater than the distance between the functionally outer surfaces of the shrouds to provide limited clearance between the parts and shrouds, the said parts being unattached to the shrouds, the said parts being bendable from a condition providing clearance for passage of the parts through the openings in the shrouds to a position extending laterally from the vane so as to overlie a shroud.

5. A turbine nozzle comprising, in combination, a first shroud, a second shroud, hollow vanes extending from one shroud to the other, the shrouds having openings therethrough dimensioned to receive the vanes slidably, the vanes extending slidably through the openings and being slightly longer than the distance between the functionally outer surfaces of the shrouds, and a retainer for each vane extending through the vane and having a head on the retainer at each end of the vane extending laterally from the vane so as to engage the end of the vane and overlie the functionally outer surfaces of the shrouds, the distance between the heads being greater than the distance between the functionally outer surfaces of the shrouds to provide limited clearance between the heads and shrouds, the heads being unattached to the shrouds.

6. A turbine nozzle comprising, in combination, a first shroud, a second shroud, hollow vanes extending between the shrouds, the vanes extending slidably through openings in each shroud, washers retained on and overlying each end of each vane and overlying the functionally outer surface of the adjacent shroud to retain the vane in the shrouds, and securing means extending through each vane engaging and retaining the washers therein.

7. A turbine nozzle as recited in claim 6 in which the said securing means is a rivet.

8. A turbine nozzle as recited in claim 6 in which the said securing means comprises a nut and bolt.

9. A turbine nozzle comprising, in combination, a first shroud, a second shroud, hollow vanes extending between the shrouds, the vanes extending slidably through openings in each shroud, and bendable means carried by the vanes at each end of each vane bendable into position to overlie the functionally outer surface of the adjacent shroud and overlying said surface with clearance to retain the vane in the shrouds with limited freedom for sliding movement.

10. A nozzle as recited in claim 9 in which the said bendable means are tabs of sheet metal.

11. A nozzle as recited in claim 9 in which the said bendable means are integral with the vanes.

12. A turbine nozzle comprising, in combination, a first shroud a second shroud, the shrouds having openings, hollow vanes extending spanwise of the vanes from one shroud to the other and freely mounted in the openings in the shrouds so as to be slidable spanwise of the vanes in the shrouds, and means retaining said vanes against sliding out of the shrouds, said retaining means comprising a part extending through each of said vanes including heads on the part engaging the ends of the vane and extending laterally from the vane in position to overlie the shrouds.

13. A turbine nozzle comprising, in combination, a first shroud, a second shroud, the shrouds having openings, hollow vanes extending spanwise of the vanes from one shroud to the other and freely mounted in the openings in the shrouds so as to be slidable spanwise of the vanes in the shrouds, and means retaining said vanes against sliding out of the shrouds, said retaining means comprising a key extending through each vane including heads on the key extending laterally from the vane in position to overlie the ends of the vane and the shrouds, one said head being defined by a deformable tab on the key.

14. A turbine nozzle comprising, in combination, a first shroud, a second shroud, hollow vanes extending between the shrouds, the vanes extending slidably through openings in each shroud, parts extending through the vanes, and deformable means integral with the said parts at each end of each vane deformable over the ends of the vanes into position to overlie the functionally outer surface of the adjacent shroud and overlying said surface with clearance to retain the vane in the shrouds with limited freedom for sliding movement.

References Cited in the file of this patent

UNITED STATES PATENTS

| | | |
|---|---|---|
| 1,310,676 | Sherbondy | July 22, 1919 |
| 1,602,009 | Germeyer | Oct. 5, 1926 |
| 1,876,518 | Mathis | Sept. 6, 1932 |
| 2,337,619 | Miller | Dec. 28, 1943 |
| 2,357,628 | Boerger | Sept. 5, 1944 |
| 2,625,013 | Howard et al. | Jan. 13, 1953 |
| 2,625,793 | Mierley et al. | Jan. 20, 1953 |
| 2,653,547 | Langdon | Sept. 29, 1953 |
| 2,667,327 | Handigg | Jan. 26, 1954 |
| 2,718,350 | Burgess | Sept. 20, 1955 |
| 2,720,356 | Erwin | Oct. 11, 1955 |
| 2,761,731 | Fish | Sept. 4, 1956 |

FOREIGN PATENTS

| | | |
|---|---|---|
| 72,780 | Denmark | July 16, 1951 |
| 225,221 | Switzerland | Apr. 16, 1943 |
| 672,401 | Great Britain | May 21, 1952 |
| 879,000 | France | Nov. 2, 1942 |
| 891,422 | France | Dec. 11, 1943 |